UNITED STATES PATENT OFFICE.

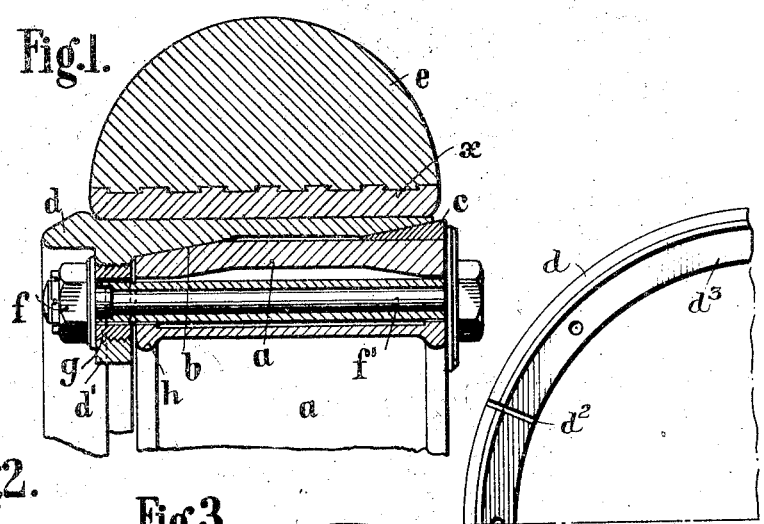
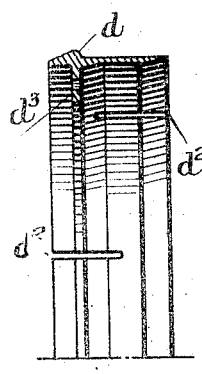
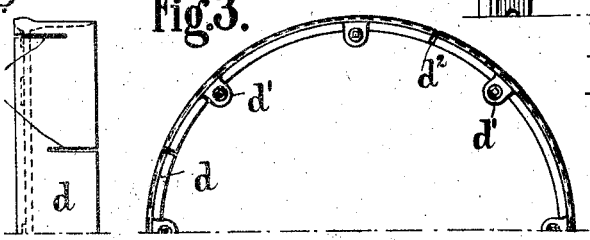
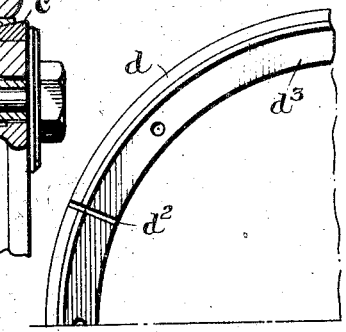
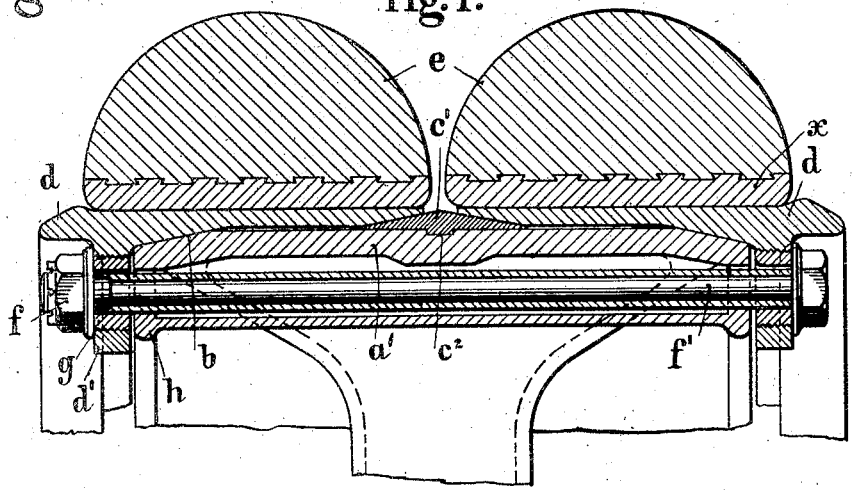

RUDOLF HAUPT, OF HANOVER, GERMANY.

DETACHABLE WHEEL-RIM.

1,103,003.   Specification of Letters Patent.   Patented July 7, 1914.

Application filed December 16, 1912. Serial No. 737,018.

*To all whom it may concern:*

Be it known that I, RUDOLF HAUPT, a subject of the King of Prussia, and residing at 34 Ferdinand-Wallbrechtstrasse, Hanover, Germany, have invented a certain new and useful Improvement in Detachable Wheel-Rims; and I do hereby declare the following to be a full, clear, and exact description of the invention.

The present invention relates to quickly detachable wheel rims and particularly to rims carrying solid tires, the object of my invention being to provide an improved mounting and demounting device therefor.

In the accompanying drawings, Figure 1 is a section through a portion of a wheel in which my invention is embodied in one form; Figs. 2 and 3 are respectively side and face views of the locking wedge ring drawn to a smaller scale; and Fig. 4 is a section of a wheel of another type in which my invention is embodied in modified form. Figs. 5 and 6 are transverse section and side elevation respectively of portion of a wedge ring slightly modified from the form shown in Figs. 2 and 3.

In the form illustrated the invention is applied to a wheel of the type in which the tire is permanently mounted on a ring which may be properly termed an outer or detachable rim. The fixed rim $a$ is provided externally at one side of its periphery with an inclined face $b$ and has fitted on it externally at the other side a conical wedge ring $c$ the taper of which corresponds to that of the inclined surface $b$. A wedge ring $d$ in assembled position surrounds this fixed rim $a$ and is provided on its inner periphery with inclined faces coöperating with the faces $b$ and $c$ of the fixed rim. This wedge ring, which holds in position the outer detachable rim $x$ for the rubber tire $e$ is provided (as shown in Figs. 2 and 3) with an inwardly extending flange abutment $d^3$ or series of lugs, $d^1$ (Figs. 5-6 and 2-3 respectively) perforated to permit the passage of the bolts $f^1$ therethrough as well as through the fixed rim, so that the nuts $f$ which screw on the bolt ends and engage the wedge ring thus easily force the latter into locking position. The wedge ring is further formed with a number of slits $d^2$ that extend from both sides but not entirely across the ring and which admit of the ring being readily pressed firmly onto the fixed rim or in other words being clamped tightly in place between the fixed rim $a$ and the detachable rim $x$ by means of the nuts $f$.

Screwed into the perforations in the flange $d^3$ or lugs $d^2$ of the wedge ring through which the bolts $f^1$ pass, are centrally apertured releasing screws $g$ which afford means for withdrawing the wedge ring when it is desired to remove the detachable rim. In order to effect this, the nuts $f$ and their bolts $f^1$ must first be removed. A key may then be inserted in the rectangular bore of the screw $g$ and the latter screwed in against the abutment flange $h$ of the fixed rim. Obviously continued rotation of the screw $g$ after it reaches this position, results in the withdrawal of the wedge ring, thus freeing the demountable rim. The number of slits formed in the wedge ring $d$ and the number of bolts and nuts $f$, $f^1$, and likewise the number of detaching screws $g$ may be as many or as few as desired.

The invention may be applied equally well to wheels with a plurality of detachable rims as shown in Fig. 4. Here the fixed rim $a^1$ has a pair of beveled faces on each side of the mid-plane of the wheel, and the wedge rings $d$ are drawn on from opposite sides of the wheel. In the form shown the two central wedge faces on the fixed rims are formed by a ring $c^1$ positioned on the fixed rim $a^1$ by an internal flange $c^2$ which engages an annular recess in the outer periphery of the fixed rim. The drawn-on bolts pass through the flanges $d^1$ of both wedge rings, and the releasing screws $g$ effect the withdrawal of the wedge ring in precisely the same manner as hereinbefore described.

I claim as my invention:—

1. In a detachable rim device for wheels, a fixed rim and a detachable rim and interposed between the same a wedge ring transversely slotted from opposite edges of the ring at a plurality of points spaced around the same, and means for forcing said wedge ring into locking position between said fixed and detachable rims.

2. In a detachable rim device for wheels, a fixed rim and a detachable rim and interposed between the same a wedge ring transversely slotted alternately from opposite edges of the ring at a plurality of points spaced around the same, and means for forcing said wedge ring into locking position between said fixed and detachable rims.

3. In a detachable rim device for wheels, a fixed rim and a detachable rim and interposed between the same a wedge ring transversely slotted at a plurality of points spaced around the same, a radially-inward-extending abutment at the side of said wedge ring, a centrally perforated releasing screw threaded in said abutment and adapted to bear against the fixed rim, a securing bolt passing through the fixed rim and said releasing screw without engaging the latter, and a nut threaded on the end of said bolt and engaging said abutment on the wedge ring beyond the edges of said releasing screw.

4. In a detachable rim device for wheels, a fixed rim, a detachable rim and interposed between the same a wedge ring having a radially-inward-extending abutment at the side thereof, means for securing said wedge ring in position, a centrally perforated releasing screw threaded in said abutment, a straight bolt forming a portion of said wedge-ring securing means and passing through said fixed rim and said releasing screw without engaging the latter and a nut threaded on the end of said bolt and engaging said abutment on the wedge ring beyond the edges of said releasing screw.

In testimony whereof I have signed my name to this specification, in the presence of two subscribing witnesses.

RUDOLF HAUPT.

Witnesses:
  OTTO FHLAN,
  GUSTAV KOCH.